US 6,708,730 B2

(12) United States Patent
Chikuma et al.

(10) Patent No.: US 6,708,730 B2
(45) Date of Patent: Mar. 23, 2004

(54) TEMPORARY FIXING STRUCTURE FOR TUBULAR BODIES

(75) Inventors: Hiroshi Chikuma, Kanagawa (JP);
Takahiro Nakakomi, Kanagawa (JP);
Hirokazu Yaezawa, Kanagawa (JP);
Yoshinobu Okuno, Barcelona (ES);
Katsumi Nakamura, Kanagawa (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/101,595

(22) Filed: Mar. 21, 2002

(65) Prior Publication Data

US 2002/0134453 A1 Sep. 26, 2002

(30) Foreign Application Priority Data

Mar. 26, 2001 (JP) ......................................... 2001-087646

(51) Int. Cl.⁷ ................................................. F16L 41/08
(52) U.S. Cl. ........................ 138/155; 138/178; 220/293; 220/297; 285/209
(58) Field of Search ................................. 138/155, 177, 138/178; 215/357, 356; 220/243, 296, 297, 300, 295, 293; 285/209, 194, 197, 81

(56) References Cited

U.S. PATENT DOCUMENTS

| 978,504 A | * 12/1910 | Stewart ...................... 285/209 |
| 3,468,565 A | * 9/1969 | Roder ......................... 285/194 |
| 4,009,731 A | * 3/1977 | Denz ........................... 138/37 |
| 4,133,560 A | * 1/1979 | Ishikawa et al. ............... 285/81 |
| 4,449,737 A | * 5/1984 | Specht ......................... 285/7 |
| 5,538,076 A | 7/1996 | Nishida et al. |
| 5,555,929 A | 9/1996 | Ishikawa |

FOREIGN PATENT DOCUMENTS

| DE | 44 45 091 A1 | 6/1995 |
| DE | 198 05 439 A1 | 8/1999 |
| EP | 0 745 824 A1 | 12/1996 |
| GB | 928633 | 6/1963 |
| GB | 2 119 046 A | 11/1983 |
| JP | 3-188315 A | 8/1991 |
| JP | 10-238992 A | 9/1998 |

* cited by examiner

Primary Examiner—Patrick Brinson
(74) Attorney, Agent, or Firm—Foley & Lardner

(57) ABSTRACT

A temporary fixing structure includes recesses formed with a mounting hole of a first tubular body to face each other wherein the diameter of the mounting hole extending along the recesses is smaller than that of a flange, and protrusions arranged at the head of an end portion of a second tubular body wherein a spacing between the protrusion and the flange is substantially equal to the thickness of a mounting surface of the first tubular body and wherein the protrusions are arranged inside the fist tubular body through the recesses. The second tubular body is turned with respect to the first tubular body to bring a flat portion of the flange into close contact with the mounting surface of the first tubular body.

8 Claims, 8 Drawing Sheets

TEMPORARY FIXING STRUCTURE FOR TUBULAR BODIES

BACKGROUND OF THE INVENTION

The present invention relates to a temporary fixing structure for tubular bodies.

In recent years, tanks for heat exchangers such as radiator and condenser are made of aluminum. Such tanks comprise an aluminum tank main body and an aluminum pipe brazed thereto for serving as a cooling water or coolant supplying or discharging tube.

Brazing of the pipe to the tank main body is carried out such that after temporarily fixing the pipe to the tank main body, the assembly is coated with a noncorrosive flux, and then subjected to heat treatment in a brazing furnace.

As will be described in detail later, a typical temporary fixing structure for the pipe to the tank main body is carried out by calking a protrusion formed at the head of an end portion of the pipe.

However, the typical temporary fixing structure presents a problem of requiring a special jig and enormous man-hours for calking the protrusion formed at the head of an end portion of the pipe.

Moreover, when forming a mounting hole in a flat mounting surface of the tank main body through, e.g. punch working, the mounting surface is bent inward with the mounting hole as center. Thus, after temporary fixing of the pipe to the tank main body, a clearance is formed between a flange of the pipe and the mounting surface of the tank main body, which may make sure brazing of the flange to the mounting surface difficult.

SUMMARY OF THE INVENTION

It is, therefore, an object of the present invention to provide a temporary fixing structure for tubular bodies, which allows easy and secure temporary fixing of tubular bodies with no special jig and less man-hours.

The present invention provides generally a structure which comprises: a first tubular body, the first tubular body having a surface with a hole; a second tubular body, the second tubular body having an end portion inserted in the hole of the first tubular body; a flange arranged at the end portion of the second tubular body, the flange including a flat portion abutting on the surface of the first tubular body; recesses formed with the hole of the first tubular body, the recesses facing each other, wherein a diameter of the hole extending along the recesses is smaller than that of the flange; and protrusions arranged at a head of the end portion of the second tubular body, wherein a spacing between each protrusion and the flange is substantially equal to a thickness of the surface of the first tubular body, wherein the protrusions are arranged inside the fist tubular body through the recesses, wherein the second tubular body is turned with respect to the first tubular body to bring the flat portion of the flange into close contact with the surface of the first tubular body.

A main feature of the present invention is to provide a structure which comprises: a first tubular body, the first tubular body having a surface with a hole; a second tubular body, the second tubular body having an end portion inserted in the hole of the first tubular body; a flange arranged at the end portion of the second tubular body, the flange including a flat portion abutting on the surface of the first tubular body; a brazing material placed on at least one of the flat portion of the flange and a portion of the face of the first tubular body corresponding to the flat portion; recesses formed with the hole of the first tubular body, the recesses facing each other, wherein a diameter of the hole extending along the recesses is smaller than that of the flange; and protrusions arranged at a head of the end portion of the second tubular body, wherein a spacing between each protrusion and the flange is substantially equal to a thickness of the surface of the first tubular body, wherein the protrusions are arranged inside the fist tubular body through the recesses, wherein the second tubular body is turned with respect to the first tubular body to bring the flat portion of the flange into close contact with the surface of the first tubular body.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 13:
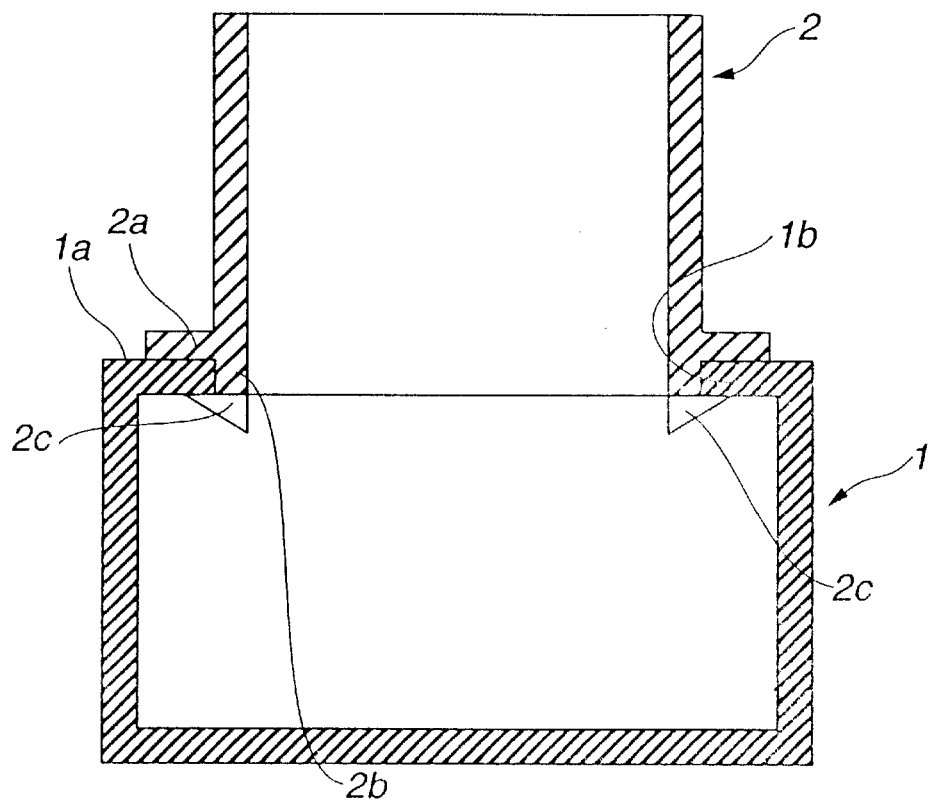
FIG. 13 is a view similar to FIG. 9, showing a temporary fixing structure for tubular bodies in the related art.
Figure 14:
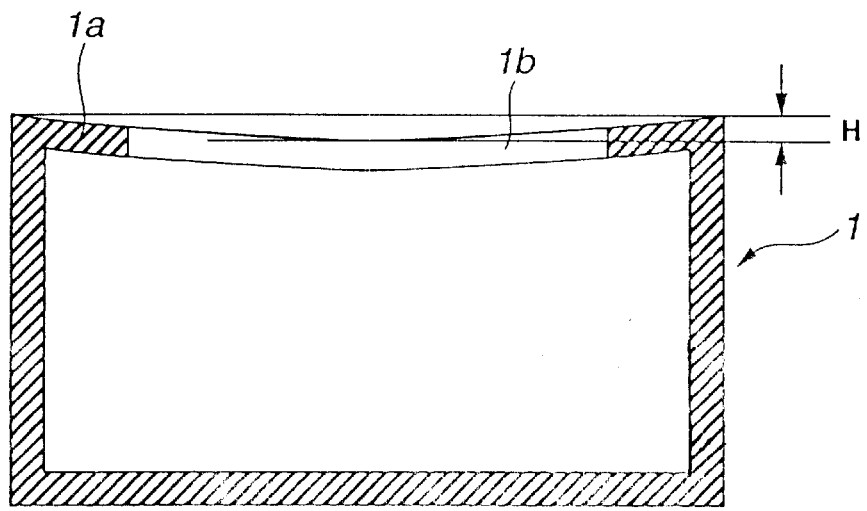
FIG. 14 is a view similar to FIG. 13, showing the bent state of the mounting surface of the first tubular body of FIG. 13.

Referring to FIGS. 13–14, before entering an explanation on a temporary fixing structure for tubular bodies embodying the present invention, the typical temporary fixing structure will be described in a little more detail. Referring to FIG. 13, one side of a tank main body 1 with a rectangular section serves as a mounting surface 1a to which a pipe 2 is fixed. The mounting surface 1a is formed with a mounting hole 1b. A flange 2a is formed with the pipe 2, and has an end portion 2b located ahead of the flange 2a and inserted in the mounting hole 1b of the mounting surface 1a of the tank main body 1.

As described hereinbefore, the pipe 2 is temporarily fixed to the tank main body 1 by calking a protrusion 2c formed at the head of the end portion 2b of the pipe 2. Such calking requires a special jig and enormous man-hours.

Moreover, referring to FIG. 14, when forming the mounting hole 1b in the flat mounting surface 1a of the tank main body 1, the mounting surface 1a is bent inward with the mounting hole 1b as center, wherein a center bend dimension H is, for example, in the order of 0.1–0.3 mm. Thus, after temporary fixing, a clearance is formed between the flange 2a of the pipe 2 and the mounting surface 1a of the tank main body 1, which may make sure brazing of the flange 2a to the mounting surface 1a difficult.

Referring now to FIGS. 1–12, a temporary fixing structure for tubular bodies embodying the present invention will be explained in detail.

Figure 1:
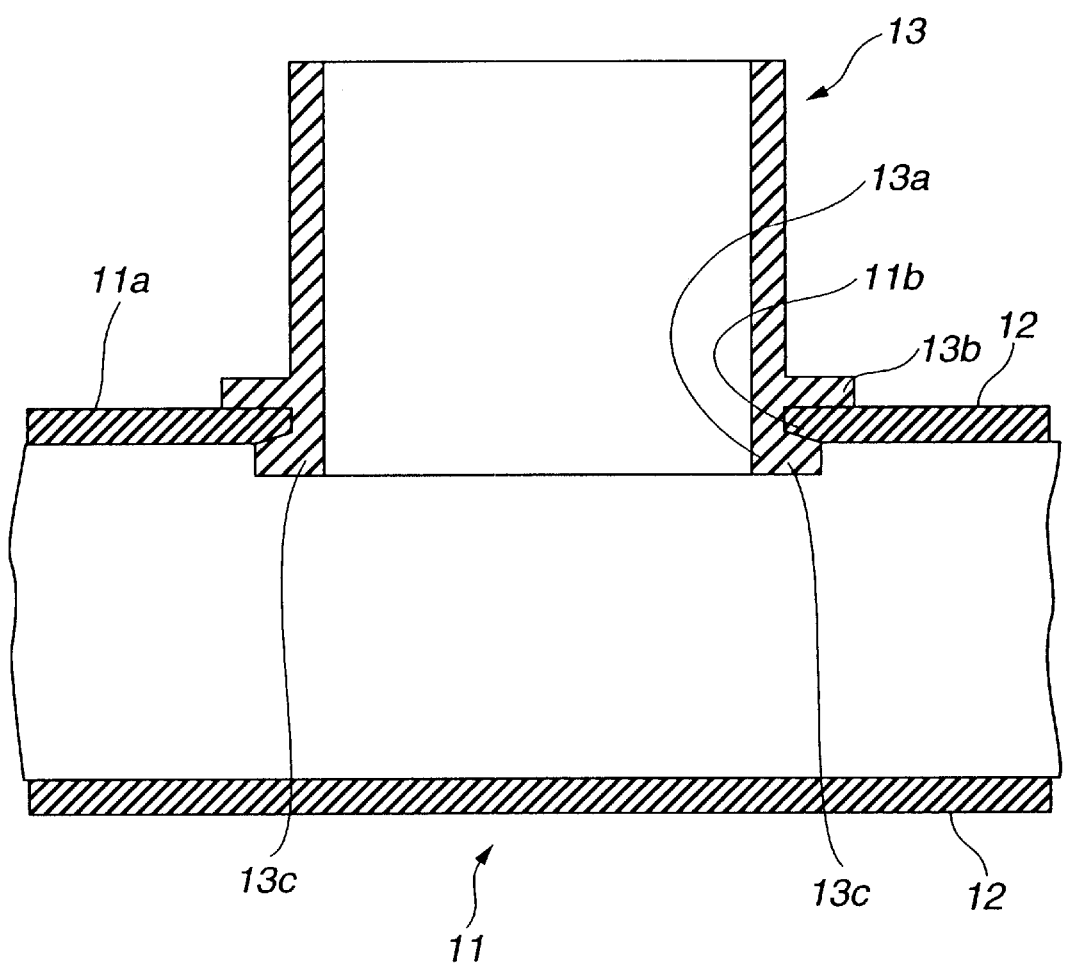
FIG. 1 is a longitudinal section showing a first embodiment of a temporary fixing structure for tubular bodies according to the present invention.
Figure 2:
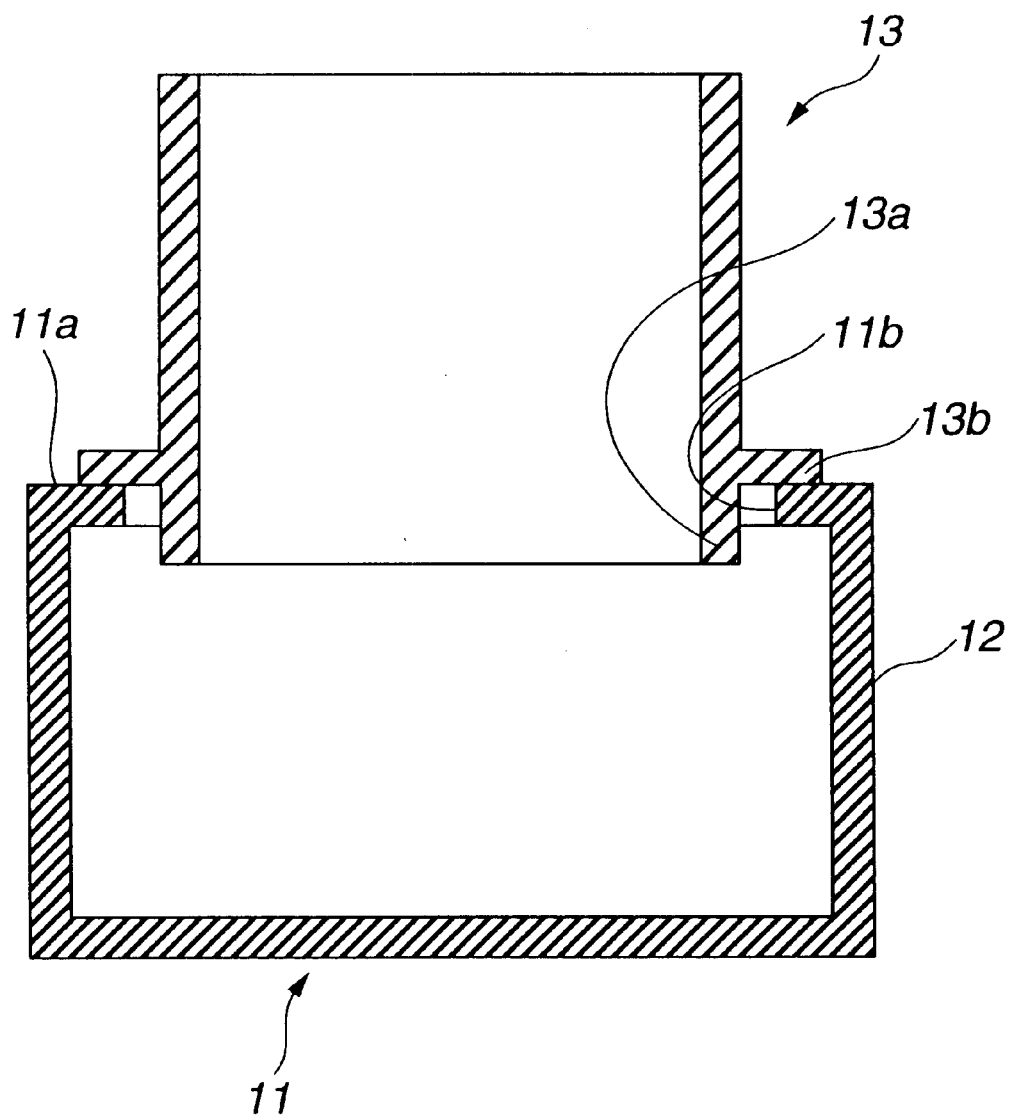
FIG. 2 is a cross section taken along the axis the second tubular body.

Referring to FIGS. 1–2, there is shown a first embodiment of a temporary fixing structure for tubular bodies according to the present invention. In this embodiment, temporarily fixed to a first tubular body 11 as a tank main body of a heat exchanger such as radiator is a second tubular body 13 as a pipe for supplying or discharging cooling water or coolant.

The first tubular body 11, which is made of aluminum, has a rectangular cross section, and is clad with a brazing material 12 on its outer surface and a sacrifice corrosion material on its inner surface. The thickness of the brazing material 12 as clad is 0.15 mm or less.

Figure 3:
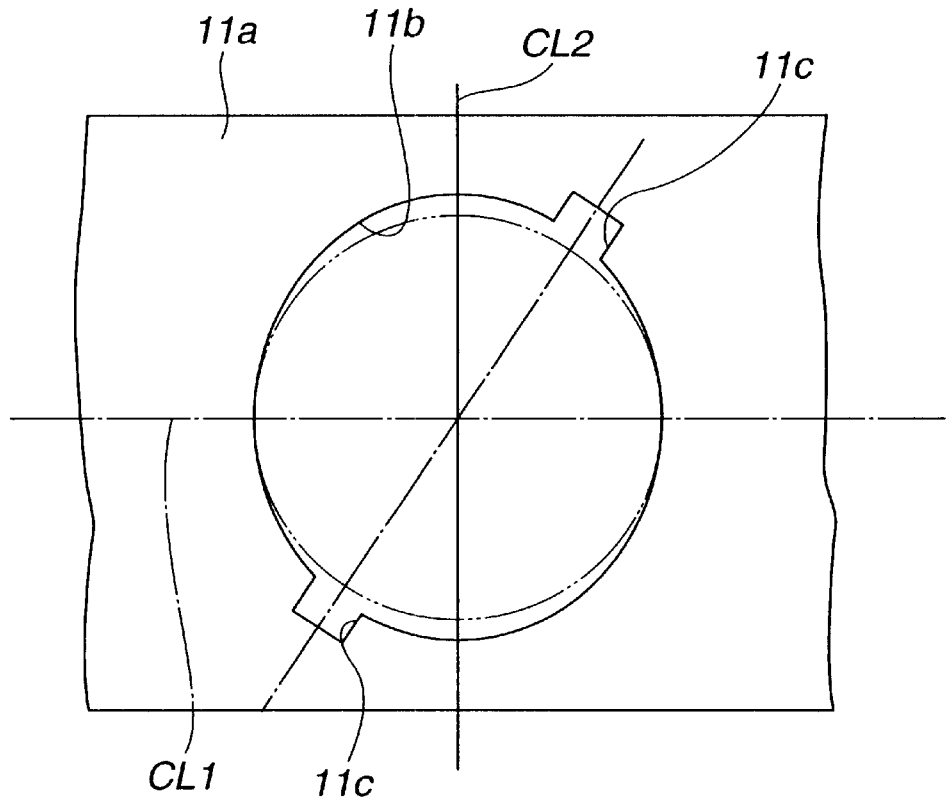
FIG. 3 is a top view showing the first tubular body.

A mounting hole 11b is formed in a mounting surface 11a of the first tubular body 11, in which an end portion 13a of the second tubular body 13 is inserted. Referring to FIG. 3, the mounting hole 11b is formed like an ellipse so that the diameter in the direction of a centerline CL1 of the first tubular body 11 extending along the axial direction thereof is smaller than that in the direction of a centerline CL2 intersecting the axial direction at right angles.

Recesses 1c are formed at the mounting hole 1b on both sides of the centerline CL1 to face each other. In this embodiment, each recess 11c is rectangular, and forms at an angle of 60° with respect to the centerline CL1.

On the other hand, the second tubular body 13, which is made of aluminum, has a round cross section, and is clad with a sacrifice corrosion material on its inner surface.

A flange 13b is integrally formed with the second tubular body 13. The flange 13b protrudes annularly along the outer periphery of the second tubular body 13. A flat portion 13h to be brazed to the mounting surface 11a is annularly formed with the flange 13b on side of the mounting surface 11a. The head of the end portion 13a of the second tubular body 13 located ahead of the flange 13b is inserted in the mounting hole 11b of the first tubular body 11.

Protrusions 13c, which can pass through the recesses 11c, are formed at the head of the end portion 13a of the second tubular body 13. Each protrusion 13c is so formed that the spacing between the protrusion 13c and the flange 13b is substantially equal to the thickness of the mounting surface 11a of the first tubular body 11.

Figure 4:
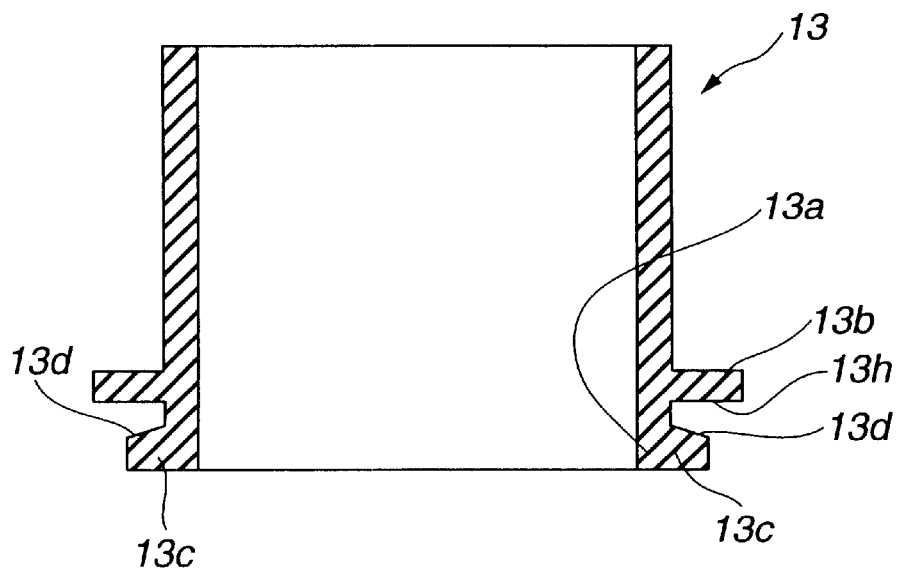
FIG. 4 is a side view showing the second tubular body.

Referring to FIG. 4, in this embodiment, the side of the protrusion 13c of the second tubular body 13 facing the flange 13b includes an inclined face 13d inclined outward.

Figure 5:
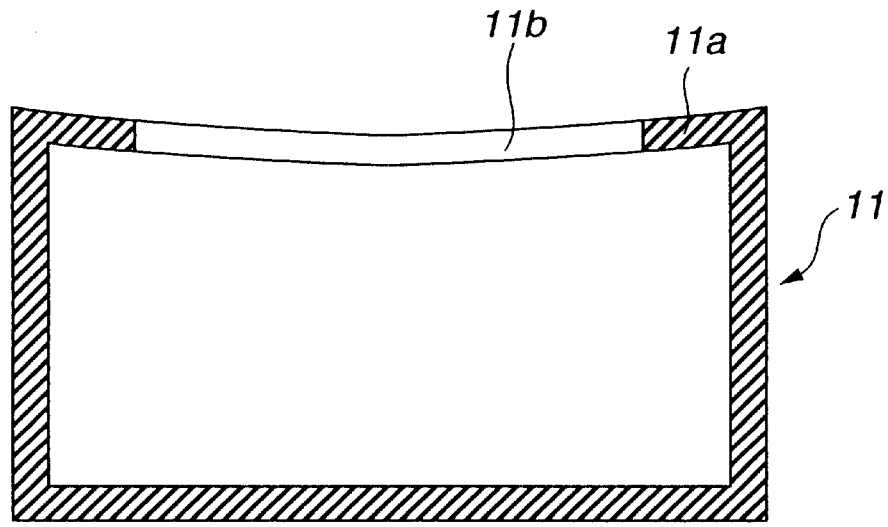
FIG. 5 is a view similar to FIG. 2, showing the shape of the first tubular body before temporary fixing.

In this embodiment, the second tubular body 13 is temporarily fixed to the first tubular body 11 as described below. Referring to FIG. 5, in this embodiment, before temporary fixing of the second tubular body 13 to the first tubular body 11, the mounting surface 11a of the first tubular body 11 is bent inward for the reason of machining, etc.

Figure 6:
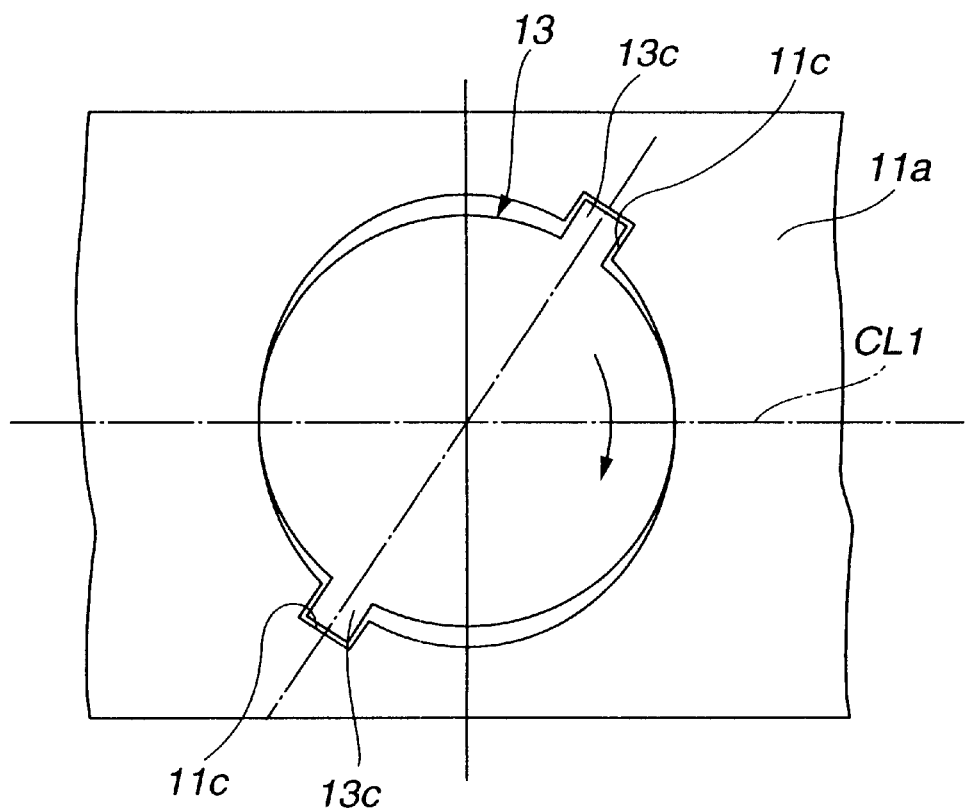
FIG. 6 is a view similar to FIG. 3, showing protrusions of the second tubular body inserted in recesses of a mounting surface of the first tubular body.
Figure 7:
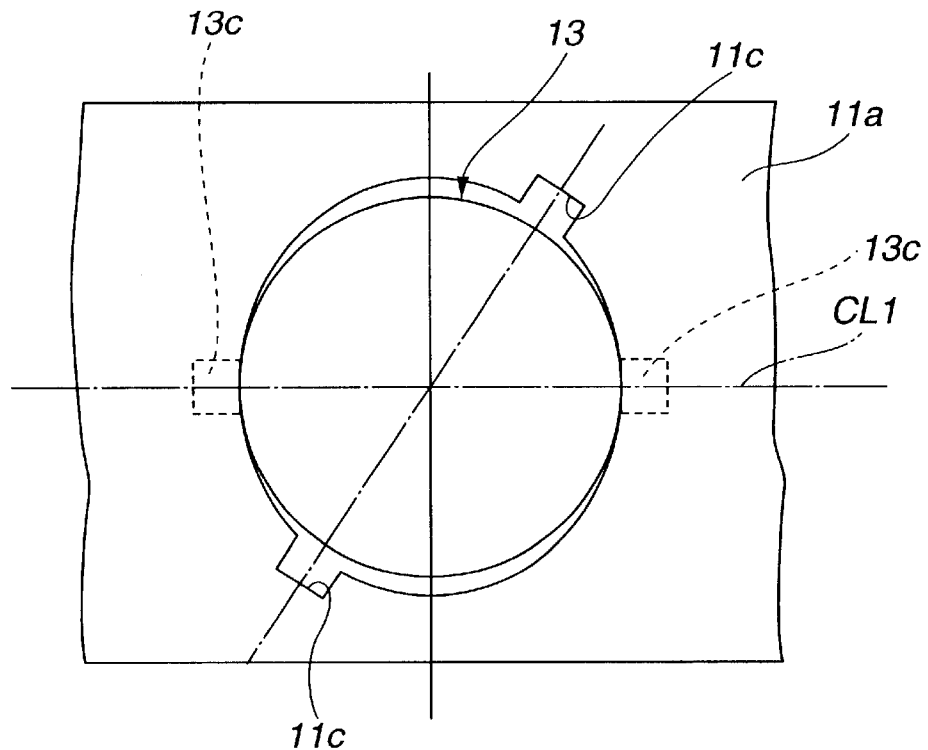
FIG. 7 is a view similar to FIG. 6, showing the second tubular body turned from the state of FIG. 6.
Figure 8:
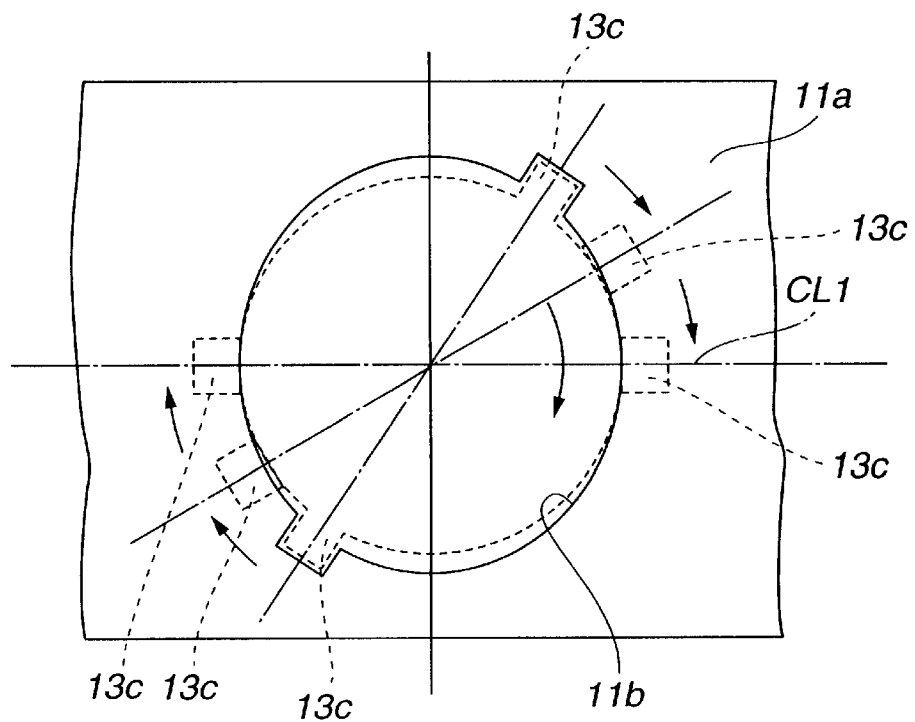
FIG. 8 is a view similar to FIG. 7, showing the relationship between the protrusions of the second tubular body and the edge of a mounting hole.

Referring to FIG. 6, first, the protrusions 13c of the second tubular body 13 are inserted into the recesses 11c of the first tubular body 11. Then, the second tubular body 13 is turned in the direction of arrow in FIG. 6 to align the protrusions 13c with the centerline CL1 as shown in FIG. 7. This state involves the temporarily fixed state shown in FIGS. 1–2, wherein the flange 13b of the second tubular body 13 abuts on the mounting surface 11a of the first tubular body 11, obtaining firm temporary fixing of the second tubular body 13 to the first tubular body 11.

In the first embodiment, since the mounting surface 11a of the first tubular body 11 is bent inward for the reason of machining, etc. as shown in FIG. 5, two edges of the first tubular body 11 at the mounting hole 11b and along the centerline CL1 are deformed outward by the protrusions 13c of the second tubular body 13, which leads to not only correction of a bend of the mounting surface 11a, but firm temporary fixing of the second tubular body 13 to the first tubular body 11.

Moreover, in the first embodiment, the side of the protrusion 13c of the second tubular body 13 facing the flange 13b includes inclined face 13d inclined outward, and the mounting hole 11b of the first tubular body 11 is formed like an ellipse with smaller diameter or minor axis in the direction of the centerline CL1. Thus, referring to FIG. 8, when the second tubular body 13 is turned in the direction of arrows after inserting the protrusions 13c of the second tubular body 13 into the recesses 13c, the edge of the mounting hole 11b is positioned on the inward side of the inclined face 13d as the protrusions 13c approach the centerline CL1. And therefore, a portion of the first tubular body 11 corresponding to the edge of the mounting hole 11b is firmly held between the inclined face 13d and flange 13b through the cam action of the inclined face 13d.

Further, in the first embodiment, the protrusions 13c of the second tubular body 13 are inserted into the recesses 11c of the first tubular body 11, and then the second tubular body 13 is turned to align the protrusions 13c with the centerline CL1, leading to the flange 13b of the second tubular body 13 abutting on the mounting surface 11a of the first tubular body 11. This allows easy and secure temporary fixing of the flanges 13b of the second tubular body 13 to the flat mounting surface 11a of the first tubular body 11 in the close contact state.

Therefore, no clearance is formed between the flange 13b of the second tubular body 13 and the mounting surface 11a of the first tubular body 11 after temporary fixing of the second tubular body 13 to the first tubular body 11, allowing secure brazing of the flange 13b to the mounting surface 11a. Especially, when the mounting surface 11a of the first tubular body 11 is bent inward in the direction intersecting the axial direction at right angles for the reason of machining, etc., the edges of the first tubular body 11 at the mounting hole 11b and along the centerline CL1 are deformed outward by the protrusions 13c of the second tubular 13, allowing firm temporary fixing of the second tubular body 13 to the first tubular body 11 while correcting a bend of the mounting surface 11a.

Furthermore, in the first embodiment, the side of the protrusion 13c of the second tubular body 13 facing the flange 13b includes inclined surface 13d inclined outward, so that even if any machining error occurs in the spacing between the flange 13b of the second tubular body 13 and the protrusion 13c, the flange 13b of the second tubular body 13 can securely abut on the mounting surface 11a of the first tubular body 11.

Still further, in the first embodiment, the side of the protrusion 13c of the second tubular body 13 facing the flange 13b includes inclined surface 13d inclined outward, and the mounting hole 11b of the first tubular body 11 is formed like an ellipse with smaller diameter or minor axis in the direction of the centerline CL1, allowing firmer temporary fixing of the flange 13b of the second tubular body 13 to the flat mounting surface 11a of the first tubular body 11.

Furthermore, in the first embodiment, the thickness of the brazing material 12 is 0.15 mm or less, so that the brazing material 12, even if melted during brazing, can be maintained between the mounting surface 11a of the first tubular body 11 and the flange 13b of the second tubular body 13 which are in close in contact with each other, allowing firm brazing.

Figure 9:
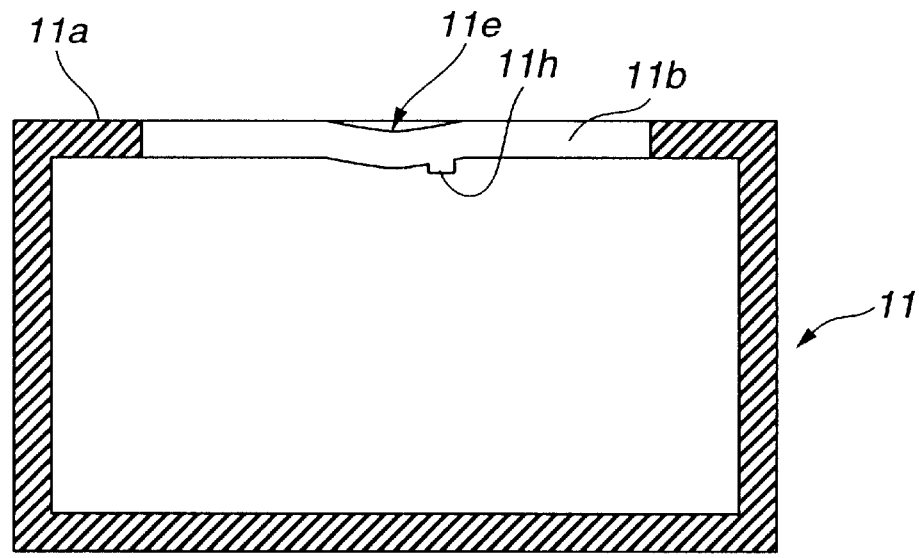
FIG. 9 is a view similar to FIG. 5, showing a second embodiment of the present invention.
Figure 10:
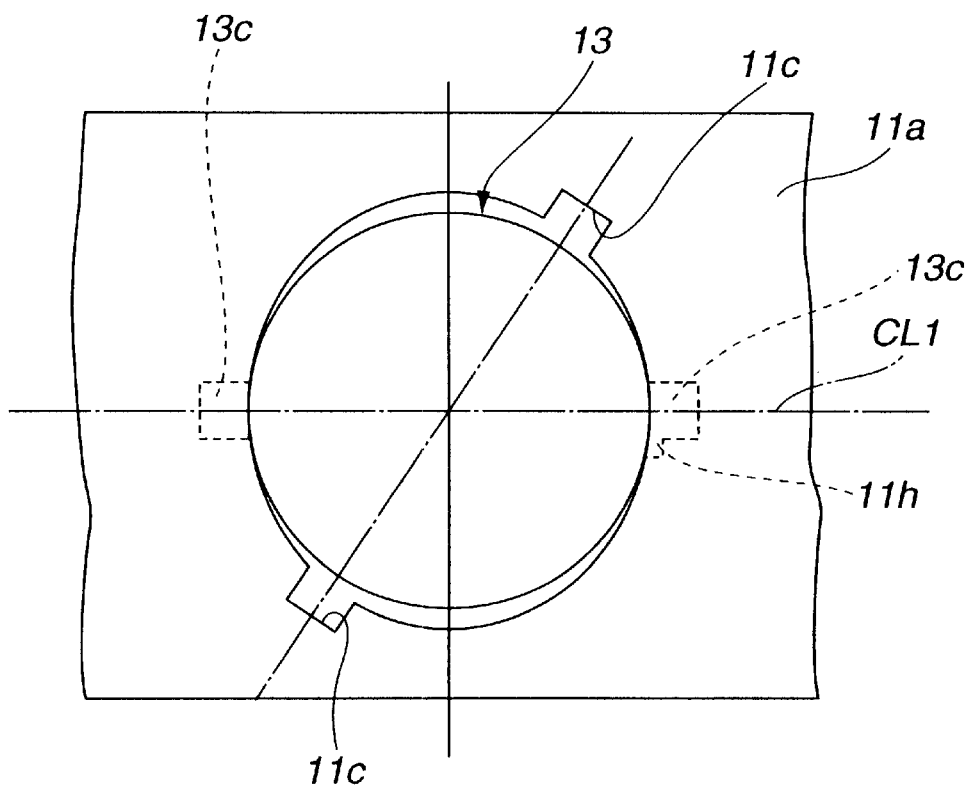
FIG. 10 is a view similar to FIG. 8, showing the first tubular body of FIG. 9.

Referring to FIGS. 9–10, there is shown a second embodiment of a temporary fixing structure for tubular bodies according to the present invention, wherein before temporary fixing of the second tubular body 13 to the first tubular body 11, the first tubular body 11 is slightly deformed inward at the edges of the mounting hole 11b along the centerline CL1 to form a depression 11e. The depression 11e is formed, for example, during press working of the mounting hole 11b into the mounting surface 11a.

A positioning protrusion 11h is formed with the first tubular body 11 at one edge of the mounting hole 11b and on one side with respect to the centerline CL1. The positioning protrusion 11h serves to position the second tubular body 13 by abutting on the side of the protrusion 13c of the second tubular body 13. The other structures are the same as those in the first embodiment, and therefore, a detailed explanation thereof is omitted.

In the second embodiment, when the second tubular body 13 is turned after inserting the protrusions 13c of the second tubular body 13 into the recesses 11c of the first tubular body 11, the protrusions 13c bring the mounting surface 11a and the flange 13b into close contact through the cam action of the depression 11e at the edges of the first tubular body 11 at the mounting hole 11b and along the centerline CL1, achieving firm temporary fixing of the second tubular body 13 to the first tubular body 11. This allows firmer temporary fixing of the second tubular body 13 by the first tubular body 11.

Moreover, in the second embodiment, the positioning protrusion 11h is formed at the edge of the mounting hole 11b of the first tubular body 11, allowing easy and secure positioning of the second tubular body 13.

It is noted that, in the second embodiment, due to provision of the depression 11e, the protrusion 13c may be formed without inclined surface 13d.

Figure 11:
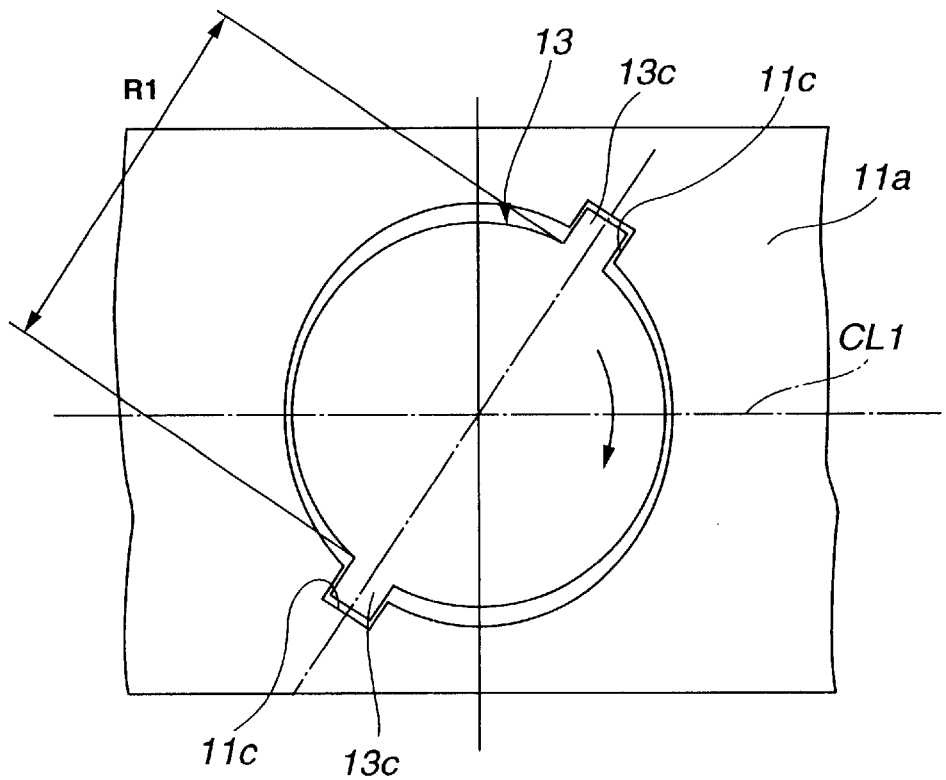
FIG. 11 is a view similar to FIG. 10, showing a third embodiment of the present invention.

Referring to FIG. 11, there is shown a third embodiment of a temporary fixing structure for tubular bodies according to the present invention, wherein the outer periphery between the flange 13b and the protrusions 13c of the second tubular body 13 is formed like an ellipse so that a diameter R1 corresponding to the protrusions 13c is the largest. The other structures are the same as those in the first embodiment, and therefore, a detailed explanation thereof is omitted.

In the third embodiment, the outer periphery between the flange 13b and the protrusions 13c of the second tubular body 13 is formed like an ellipse so that a diameter R1 corresponding to the protrusions 13c is the largest, causing no interference of the second tubular body 13 with the mounting hole 11b, allowing easy turning of the second tubular body 13.

Moreover, in the third embodiment, maintaining of the dimensional accuracy of the smaller diameter of the mounting hole 11b of the first tubular body 11 along the centerline CL1 and the largest diameter R1 of the outer periphery of the second tubular body 13 corresponding to the protrusions 13c allows firm temporary fixing of the first and second tubular bodies 11, 13, facilitating machining thereof.

Figure 12:
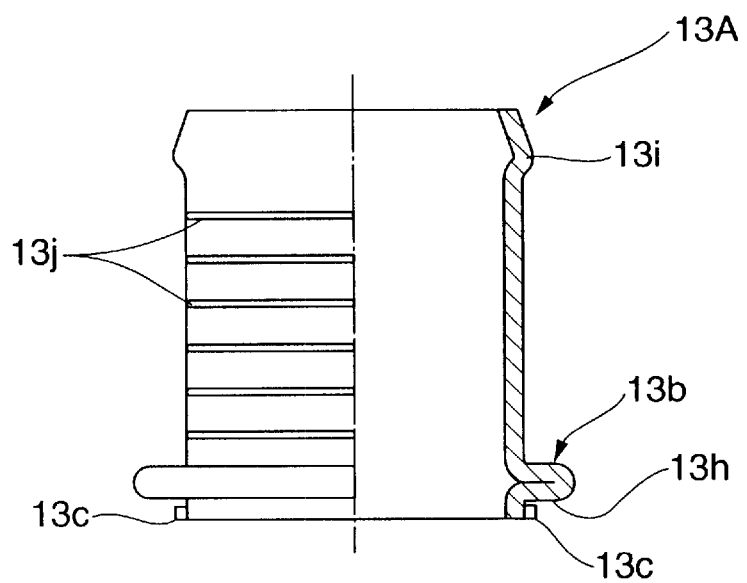
FIG. 12 is a schematic drawing showing the details of the second tubular body of FIG. 11.

Referring to FIG. 12, there is shown an example of the specific shape of the second tubular body. In this example, the second tubular body 13A is obtained out of a pipe member, and includes a flat portion 13h on the side of the protrusion 13c of the flange 13b. The second tubular body 13A includes on the side opposite to the protrusions 13c an annular protrusion 13i and small protrusions 13j for preventing hose coming-off. The other structures are the same as those in the first embodiment, and therefore, a detailed explanation thereof is omitted.

Having described the present invention with regard to the preferred embodiments, it is noted that the present invention is not limited thereto, and various changes and modifications can be made without departing from the scope of the present invention.

By way of example, in the illustrative embodiments, the present invention is applied to first and second tubular bodies 11, 13 of a heat exchanger. Naturally, the present invention can widely be applied to temporary fixing of two tubular bodies of various devices.

Moreover, in the illustrative embodiments, the mounting hole 11b of the mounting surface 11a of the first tubular body 11 is formed like an ellipse. Optionally, the mounting hole 11b may be formed circularly when having the mounting surface 11a bent or the depression 11e formed.

The entire teachings of Japanese Patent Application P2001-87646 filed Mar. 26, 2001 are incorporated hereby by reference.

What is claimed is:

1. A structure comprising:
    a first tubular body, the first tubular body having a surface with a hole;
    a second tubular body, the second tubular body having an end portion inserted in the hole of the first tubular body;
    a flange arranged at the end portion of the second tubular body, the flange including a flat portion abutting on the surface of the first tubular body;
    recesses formed with the hole of the first tubular body, the recesses facing each other, the recesses being arranged on a line inclined with respect to a longitudinal direction of the first tubular body, wherein a diameter of the hole extending along the recesses is smaller than that of the flange; and
    protrusions arranged at a head of the end portion of the second tubular body, wherein a spacing between each protrusion and the flange is substantially equal to a thickness of the surface of the first tubular body, wherein the protrusions are arranged inside the first tubular body through the recesses,
    each of the protrusions including a face opposite to the flange, the face including an inclined face inclined outward to increase the spacing.

2. The structure as claimed in claim 1, wherein the hole of the first tubular body is formed like an ellipse with a minor axis in a longitudinal direction of the first tubular body.

3. The structure as claimed in claim 1 wherein the first tubular body is deformed inward at edges of the hole in a longitudinal direction of the first tubular body.

4. The structure as claimed in claim 3, further comprising a positioning protrusion formed with the first tubular body at one edge of the hole and on one side with respect to the longitudinal direction.

5. The structure as claimed in claim 2, wherein the ellipse has the largest diameter in a direction corresponding to the protrusions.

6. The structure as claimed in claim 1, further comprising a brazing material placed on at least one of the flat portion of the flange and a portion of the face of the first tubular body corresponding to the flat portion.

7. A structure, comprising:
- a first tubular body, the first tubular body having a surface with a hole;
- a second tubular body, the second tubular body having an end portion inserted in the hole of the first tubular body;
- a flange arranged at the end portion of the second tubular body, the flange including a flat portion abutting on the surface of the first tubular body;
- a brazing material placed on at least one of the flat portion of the flange and a portion of the face of the first tubular body corresponding to the flat portion;
- recesses formed with the hole of the first tubular body, the recesses facing each other, the recesses being arranged on a line inclined with respect to a longitudinal direction of the first tubular body, wherein a diameter of the hole extending along the recesses is smaller than that of the flange; and
- protrusions arranged at a head of the end portion of the second tubular body, wherein a spacing between each protrusion and the flange is substantially equal to a thickness of the surface of the first tubular body, wherein the protrusions are arranged inside the first tubular body through the recesses, each of the protrusions including a face opposite to the flange, the face including an inclined face inclined outward to increase the spacing, wherein the second tubular body is turned with respect to the first tubular body to bring the flat portion of the flange into close contact with the surface of the first tubular body.

8. A structure, comprising:
- a first tubular body, the first tubular body having a surface with a hole;
- a second tubular body, the second tubular body having an end portion inserted in the hole of the first tubular body;
- a flange arranged at the end portion of the second tubular body, the flange including a flat portion abutting on the surface of the first tubular body;
- means for defining recesses, the recesses defining means being arranged at the hole of the first tubular body, the recesses facing each other, the recesses being arranged on a line inclined with respect to a longitudinal direction of the first tubular body, wherein a diameter of the hole extending along the recesses is smaller than that of the flange; and
- protrusions arranged at a head of the end portion of the second tubular body, wherein a spacing between each protrusion and the flange is substantially equal to a thickness of the surface of the first tubular body, wherein the protrusions are arranged inside the first tubular body through the recesses, each of the protrusions including a face opposite to the flange, the face including an inclined face inclined outward to increase the spacing, wherein the second tubular body is turned with respect to the first tubular body to bring the flat portion of the flange into close contact with the surface of the first tubular body.

* * * * *